United States Patent [19]

Oloff

[11] Patent Number: 5,275,132

[45] Date of Patent: Jan. 4, 1994

[54] TIMED PRIMATE ROTO-POSITIONING METHOD FOR PREVENTING TRAUMA AND FOR SIMULATING WEIGHTLESSNESS

[75] Inventor: Clarence M. Oloff, Lawrenceville, Ga.

[73] Assignee: The United States of America as represented by the Secretary of the Air Force, Washington, D.C.

[21] Appl. No.: 693,011

[22] Filed: Apr. 24, 1991

Related U.S. Application Data

[63] Continuation-in-part of Ser. No. 414,158, Sep. 28, 1989, abandoned, which is a continuation-in-part of Ser. No. 788,199, Oct. 17, 1985, Pat. No. 4,880,579.

[51] Int. Cl.$^5$ ................................. A61D 3/00
[52] U.S. Cl. .................................... 434/34; 119/174; 119/722; 434/59; 434/55; 600/19
[58] Field of Search ............... 119/103, 15, 174; 5/61, 5/608; 434/51, 55, 59; 600/19, 20; 108/4, 20, 21

[56] References Cited

U.S. PATENT DOCUMENTS

| | | | |
|---|---|---|---|
| Re. 26,475 | 10/1968 | Cohen | 244/1 |
| 2,707,465 | 5/1955 | Nemeth | 128/46 |
| 2,891,398 | 6/1959 | Hughes | 73/1 |
| 3,372,572 | 3/1968 | Campbell et al. | 73/1 |
| 3,457,899 | 7/1969 | Kelch et al. | 269/71 |
| 3,633,901 | 1/1972 | Lindquist | 269/323 |
| 3,700,228 | 10/1972 | Peale | 269/61 |
| 3,859,982 | 1/1975 | Dove | 128/2 |
| 4,120,266 | 10/1978 | Oloff et al. | 119/103 |
| 4,175,723 | 11/1979 | Shea, Jr. | 244/162 |
| 4,356,577 | 11/1982 | Taylor et al. | 5/60 X |
| 4,710,128 | 12/1987 | Wachsmuth et al. | 434/46 |

FOREIGN PATENT DOCUMENTS

| | | | |
|---|---|---|---|
| 6716493 | 6/1969 | Netherlands | 320/35 |
| 1060181 | 12/1983 | U.S.S.R. | 119/96 |
| 1909258 | 10/1969 | United Kingdom | 331/35 |

OTHER PUBLICATIONS

Technical Publication Presentation Control Record, France et al., Effects of Acute Hypogravic Exposure and Recovery on the Vebal Column of Juvenile Primates.

*Primary Examiner*—Gene Mancene
*Assistant Examiner*—Todd E. Manahan
*Attorney, Agent, or Firm*—Fredric L. Sinder; Thomas L. Kundert

[57] ABSTRACT

A method, and apparatus, for rotating immobilized subhuman primate animal test subjects about one or more axes according to a preselected sequence to simulate weightlessness and to minimize trauma during simulated zero or micro-gravity studies is disclosed. The method includes intermittent rotation of the test subject ninety degrees every thirty minutes about an axis parallel to both the spine of the test animal and to the ground, and intermittent rotation of the test subject forty-five degrees every three to five minutes about each of two axes. The method is performed using a timed roto-positioning apparatus having a frame, a subframe rotatably attached to the frame, and a carrier for a primate restraint system rotatably attached to the subframe. Two motors, controlled by a programmable controller, individually rotate the subframe and the carrier according to a preselected sequence. The preferred embodiment for the apparatus is a modified A-frame structure made from welded channel aluminum beams and equipped with casters and lifters to move and securely position the apparatus. A tube with rotatable fittings is used to supply drinking water to test animals and electrical slip rings are used for transmitting physiological sensor signals from the test animal through the rotating connections of the carrier, subframe and frame. Radio telemetry may be used in place of the electrical slip rings.

6 Claims, 2 Drawing Sheets

TIMED PRIMATE ROTO-POSITIONING METHOD FOR PREVENTING TRAUMA AND FOR SIMULATING WEIGHTLESSNESS

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This is a continuation-in-part of application Ser. No. 07/414,158, filed Sep. 28, 1989, now abandoned, which was a continuation-in-part of application Ser. No. 06/788,199, filed Oct. 17, 1985, now U.S. Pat. No. 4,880,579. It also includes matter included in application Ser. No. 07/414,212, filed Sep. 28, 1989, now abandoned, which was also a continuation-in-part of application Ser. No. 06/788,199.

BACKGROUND OF THE INVENTION

This invention relates generally to test animal restraint devices, and more particularly to a rotating positioner for subhuman primate restraint systems to simulate weightlessness and minimize trauma to test animals.

Small animals, most commonly subhuman primates such as rhesus monkeys, are frequently used in ground-based studies of the effects of simulated weightlessness. These studies simulate the effects of weightlessness by immobilizing test animals for periods of time to study muscular atrophy and bone loss.

Examples of past methods of immobilizing animals include full body plaster-of-paris casts; tenectomy, or slicing and removing tendons; and denervation. Even with considerable care taken in casting animals, full body casts introduce intense psychic trauma for test animals, introducing experimental variables and delays, including abrupt termination of experiments. Weight loss and the development of decubital ulcers at bony prominences when using full body casts further reduce the length of experimental exposure. Partial casts have been used on rats, but it has been difficult correlating data obtained from quadrupeds with that from primates.

Tenectomy and denervation are operations, introducing additional variables into experiments.

A significant improvement over other immobilization techniques may be found in U.S. Pat. No. 4,120,266, to C. M. Oloff, et al. The Oloff, et al. patent describes a subhuman primate restraint system which has been successfully used in restraining subhuman primates for relatively short term centrifuge tests. The Oloff, et al. restraint system uses a combination of clamps and straps to secure the test animal to padded supports. While the Oloff, et al. restraint system is preferred over other immobilization methods, in a stationary test apparatus over an extended period of simulated weightlessness testing, it may still cause decubitus ulcers and other trauma to test animals.

It is, therefore, a principal object of the present invention to provide an apparatus and method for using a test animal restraint system in immobilizing test animals for simulated weightlessness and other long term tests that will minimize traumas.

A feature of the present invention is that it is an open framework design providing convenient access to the test animal.

Another feature of the present invention is that it provides for convenient positioning of the test animal for administering medication, performing tests, and other procedures on the test animal.

An advantage of the present invention is that it works independently of the specific test animal restraint method or apparatus used. Therefore, it may be used with almost any test animal restraint system.

These, and other objects, features and advantages of the present invention will become apparent as the detailed description of certain representative embodiments thereof proceeds.

SUMMARY OF THE INVENTION

In accordance with the foregoing principles and objects of the present invention, a novel primate roto-positioning apparatus is described which provides an attachment location for a primate restraint system and allows rotation of the primate restraint system about two axes.

The invention has a frame with a subframe rotatably attached to the frame, and a primate restraint system carrier rotatably attached to the subframe so that the carrier rotates about an axis at an angle, generally perpendicular, to the axis of rotation of the subframe. Two motors, controlled by a programmable controller, individually rotate the subframe and the carrier.

A preferred embodiment of the apparatus is described which uses channel and angle aluminum beams to form the frame and subframe. The preferred embodiment includes casters and lifters mounted on the frame to facilitate movement and secure locating of the entire apparatus. The preferred embodiment also includes means for supplying drinking water to test animals and electrical slip rings for transmitting physiological sensor signals from the test animal through the rotating connections of the carrier, subframe and frame. The invention includes radio-telemetry in place of electrical slip rings for transmitting physiological sensor signals.

The invention includes the method of rotating an immobilized or immobile test subject or patient along at least one or two axes to minimize trauma and to simulate weightlessness.

DESCRIPTION OF THE DRAWINGS

The present invention will be more clearly understood from a reading of the following detailed description in conjunction with the accompanying drawings wherein.

DETAILED DESCRIPTION

Figure 1:
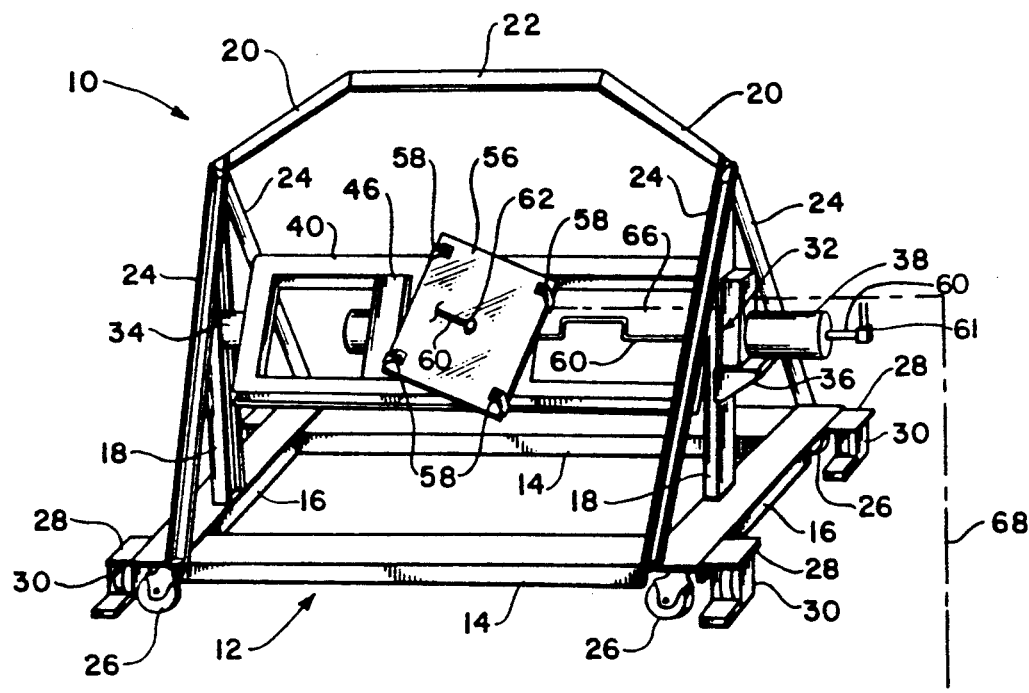
FIG. 1 is a perspective view of the present invention.

Referring now to FIG. 1 of the drawings, there is shown a perspective view of a preferred embodiment of the timed primate roto-positioner. The roto-positioner comprises a frame 10 made by welding together lengths of aluminum beams. The bottom frame section 12 is made of two long lengths 14 of channel aluminum welded to two short lengths 16 of channel aluminum to form a rectangle. Two riser channel aluminum beams 18 are perpendicularly welded to the midpoint of the short sides 16 of the bottom frame section 12 and extend to meet and be welded to a pair of overhead channel aluminum beams 20. The overhead beams 20 inwardly extend at about 45 degree angles to meet and be welded to a single horizontal channel aluminum top beam 22.

Two pairs of channel aluminum buttress beams 24 are welded between the corners of the bottom frame section 12 and the top of the riser beams 18.

Casters 26 are mounted to the four corners of the bottom frame section 12. Welded to the short sides 16 on the four corners of the bottom frame section 12 are tabs 28 to which are mounted lifters 30.

Bearings 32 and 34 are each mounted about midway on the riser beams 18. A motor mount 36 is welded on one riser beam 18 below one bearing 32. Mounted on the motor mount 36 is a motor and gear assembly 38. A hollow shaft 39 extends from the motor and gear assembly 38 through the bearing 32 to rotate a rectangular subframe 40. The other end of the subframe 40 mounts in the opposite bearing 34, allowing the subframe 40 to rotate along a horizontal axis.

Figure 2:
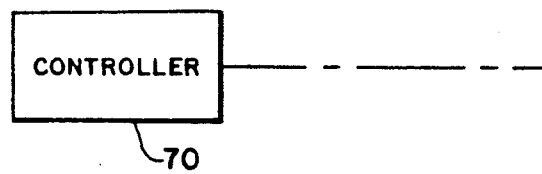
FIG. 2 is a bottom view of a subframe of the invention showing a motor and gears for rotating an attached primate restraint system carrier.
Figure 2:
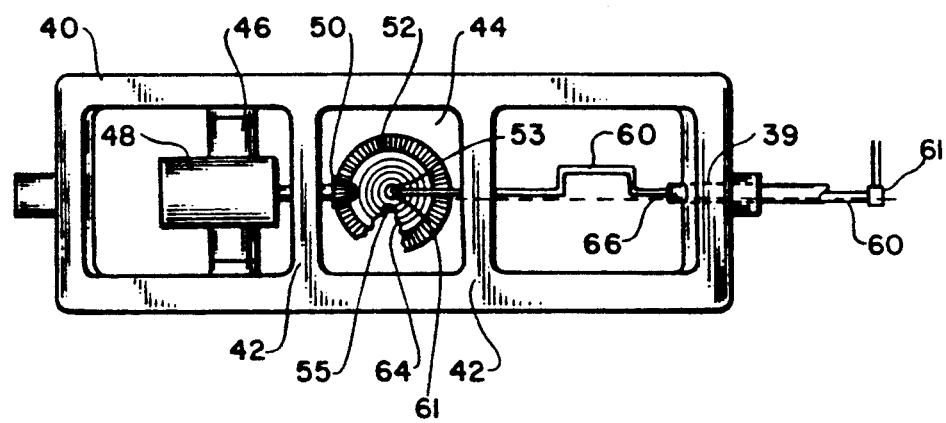

Referring now to FIG. 2, showing a bottom view of the subframe 40, and seen in conjunction with FIG. 1, there is shown a pair of metal cross-beams 42 connected across the subframe 40 to provide a mounting connection for a plate 44. Another metal cross-beam operates as a motor mount 46. Mounted to the motor mount 46 is a motor 48. The motor 48 drives the pinion gear 50 of a beveled ring and pinion gear set. The ring gear 52 has a hollow shaft 53 extending through a bearing 55 (shown in cutaway view beneath ring gear 52) mounted in the plate 44 and connected to a carrier 56 so that the carrier 56 rotates in a direction perpendicular to the axis of rotation of the subframe 40. The carrier 56 has mounting means, shown as clamps 58 in this embodiment, for attaching a primate restraint system, such as described in U.S. Pat. No. 4,120,266. A pair of rails forming the bottom of a primate restraint system may be inserted under the clamps 58, slidably adjusted for proper center of gravity orientation, and the clamp bolts tightened to secure the rails under the clamps 58.

A water line 60 extends through rotating liquid swivel fittings 61 from outside the frame 10 through hollow shaft 39 to inside the subframe 40 and through hollow shaft 53 and an access hole 62 through the carrier 56. A simple liquid swivel fitting, not shown in the Figures, is located above carrier 56 as part of the attachments for the primate restraint system and, through water line 60, provides drinking water to the test animal through a licking dispenser, which is well known in the art.

Urine and feces from the test animal are collected in a tray placed beneath the subframe 40 and carrier 56.

An assembly of electrical slip rings 64 mount inside a cutout portion of the ring gear 52 to carry low signal level outputs from physiological transducers, as might be used to monitor heart rate or brain wave activity, and which are attached to the test animal. The signals are carried by wires or other means, shown schematically as a dashed line 66, to another assembly of slip rings 63 (hidden in this view) mounted by the bearing 32, and carried by wires or other means extending outside the frame 10, shown schematically by a dashed line 68.

Figure 3:
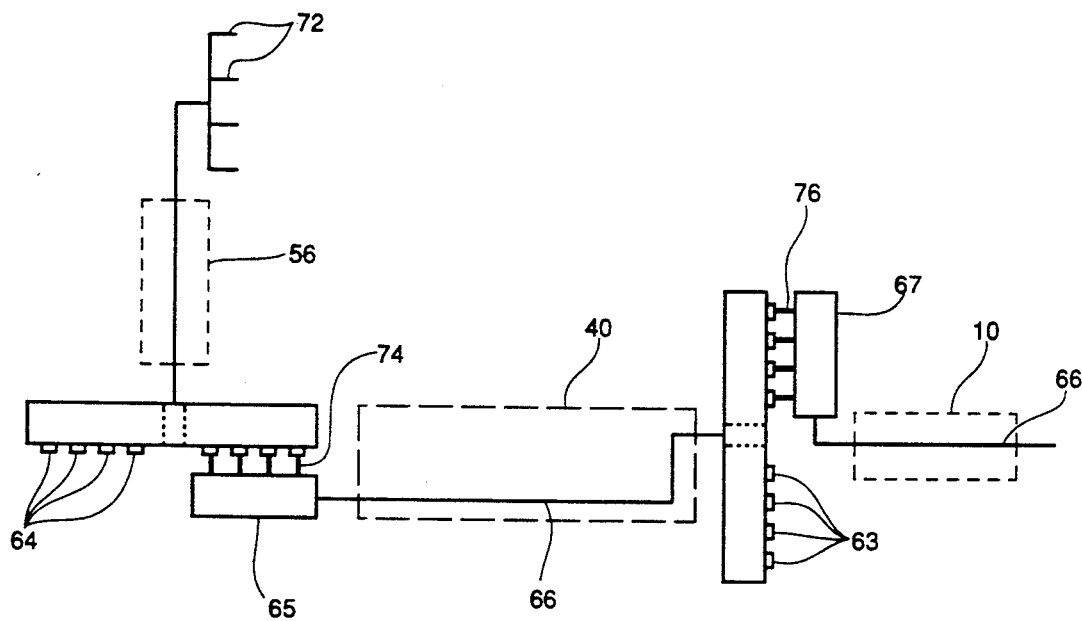
FIG. 3 is a representational diagram of an example connection of slip rings and slip ring brushes showing the transmission of physiological sensor and other signals across two separate rotational axes of the connected frame, subframe and carrier of the present invention.

Referring now to FIG. 3, there is shown a simplified diagram of an example connection of slip rings 64 and 63 with a pair of corresponding slip ring brush assemblies 65 and 67. FIG. 3 representationally shows how physiological sensor and control signals are transmitted across two separate rotational axes of connected frame 10, subframe 40 and carrier 56. Leads 72 connect to the physiological transducers on the test animal and are bundled together to connect to individual slip rings 64 inside the cutout under ring gear 52. Corresponding brushes 74 on brush assembly 65 wipe across rotating individual slip rings 64 to transmit signals carried by them from carrier 56, which rotates relative to subframe 40, to wires or other means 66 which are stationary relative to subframe 40. Additional wires or other means 66 connect to brushes 76 on brush assembly 67 which transmits the carried signals from slip rings 63 which rotates with subframe 40 relative to frame 10.

The signals from the physiological transducers, along with control lines for motor and gear assembly 38 and motor 48, extend beyond the frame along schematic paths 66 and 68 to a programmable controller and monitor 70. Typically, the controller 70 will be a microcomputer capable of controlling the motors, monitoring the physiological signals, and issuing an alarm in the event of incident. The controller 70 can be as simple as a timer for the motors and mechanical plotters for the physiological signals.

When the invention is used for immobilization studies, the test animal is restrained in a primate restraint system attached to the carrier 56. The casters 26 allow easy movement of the entire test apparatus from one location to another and the lifters 30, which extend to lift the casters off the floor, allow the apparatus to be securely positioned. Operation of the programmable controller 70 activates the motor and gear assembly 38 and the motor 48 to cause subframe 30 and carrier 56 to rotate in any direction, allowing convenient positioning of the primate restraint system to facilitate placing the test animal in the restraints and later feeding and other care.

After test preparations are complete, the controller 70 is programmed to perform a preselected sequence of rotations of the subframe 40 and the carrier 56. The rotations may be intermittent or continuous and may include full 360 degree sweeps or rocking motions through various arcs. The subframe 40 and the carrier 56 may rotate together or separately.

In previous tests the controller 70 has been programmed to intermittently drive the motor and gear assembly 38 to every thirty minutes slowly turn the subframe 40 ninety degrees. Each ninety-degree stop has left the test animal facing straight up, straight down, or directly to the left or right, and with its spine parallel to the axis of rotation of the subframe. In addition to the immobilization imposed by the primate restraint device, this intermittent sequence of rotation has successfully produced a uniform deloading of gravitationally induced stress on the tested monkeys. In addition, the rotation has prevented the development of ulcers and other sores on the test animal at restraint contact points and bony prominences. It has also helped prevent the development of hypostatic pneumonia, which may develop from the natural accumulation of fluids toward the bottom of the lungs of a test subject forced to remain in a stationary position for long periods of time, and reduces abdominal swelling. An advantage of the described use of the invention is that the prevention of physical trauma has also prevented psychic trauma, so that the tested monkeys willingly accept feeding and otherwise adapt well to the test apparatus and method.

Another intermittent sequence of rotation which will successfully prevent trauma to test animals is to intermittently rotate the test animal forty-five degrees every three to five minutes about each of two axes. This can produce up to sixty-four different positions of the test animal for deloading the stress on an immobilized test animal.

Experiments in simulating weightlessness have shown that the disclosed apparatus will work better, particularly in avoiding edema, when the intermittent sequence of rotation is about at least two axes.

Routine experimentation will produce other successful sequences of rotation, and will disclose other uses for the apparatus and its convenient positioning capabilities.

It will be seen by those skilled in the art that this invention has application to human patients who, due to coma or other severe medical problems eliminating mobility, develop bedsores and other problems similar to those experienced by test animals in simulated zero or micro-gravity studies.

It is understood that certain modifications to the invention as described may be made, as might occur to one with skill in the field of this invention, within the scope of the claims. Therefore, all embodiments contemplated have not been shown in complete detail. Other embodiments may be developed without departing from the spirit of the invention or from the scope of the appended claims.

I claim:

1. A method for preventing trauma to an immobilized animal test subject, comprising the step of rotating the test subject about at least one axis according to a preselected sequence, thereby preventing application of continuous pressure on any body part of the test subject.

2. The method for preventing trauma according to claim 1, the animal test subject having a spine and being immobilized above a horizontal ground surface, wherein the preselected sequence of rotation includes an intermittent rotation of the test subject ninety degrees every thirty minutes about said at least one axis, wherein said at least one axis is parallel to both the spine of the test subject and to the ground.

3. A method for preventing trauma to an immobilized animal test subject, comprising the step of rotating the test subject about at least two axes according to a preselected sequence, thereby preventing application of continuous pressure on any body part of the test subject.

4. A method for preventing trauma to an immobilized animal test subject, comprising the step of rotating the test subject about at least two axes according to a preselected sequence, thereby preventing application of continuous pressure on any body part of the test subject, wherein the preselected sequence of rotation includes an intermittent rotation of the test animal forty-five degrees every three to five minutes about each of said at least two axes.

5. A method for simulating weightlessness on a test subject, comprising the step of rotating the test subject about at least one axis according to a preselected sequence, wherein the preselected sequence averages the net gravitational loading over time on test animal body parts to substantially zero.

6. A method for simulating weightlessness on a test subject, comprising the step of rotating the test subject about at least two axes according to a preselected sequence, wherein the preselected sequence averages the net gravitational loading over time on test animal body parts to substantially zero.

* * * * *